April 21, 1964  C. J. GRIFFIN  3,129,510
MEANS FOR RECORDING ORAL PROPRIOCEPTION
Filed July 16, 1962  4 Sheets-Sheet 1
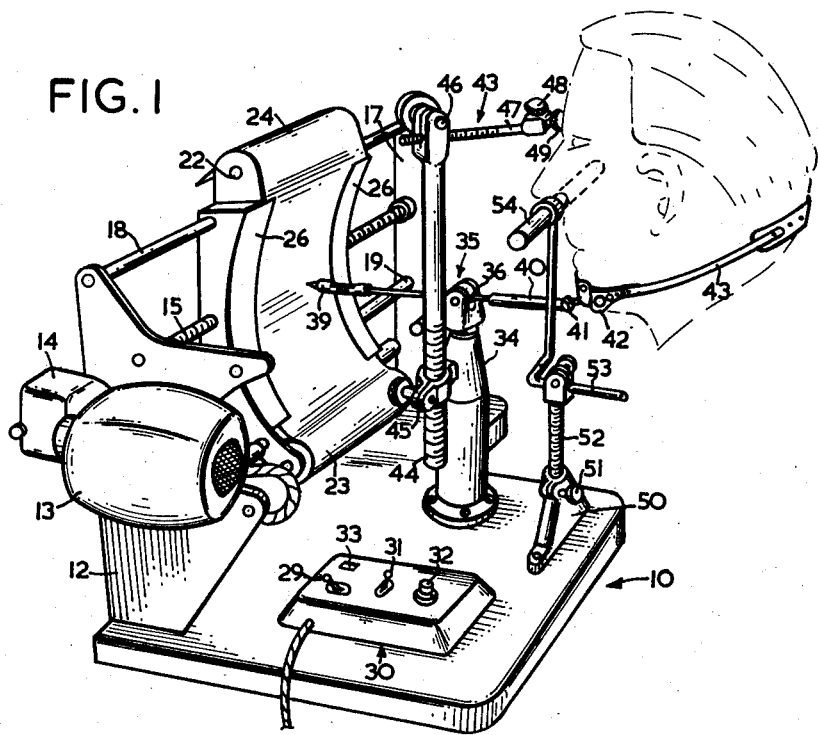
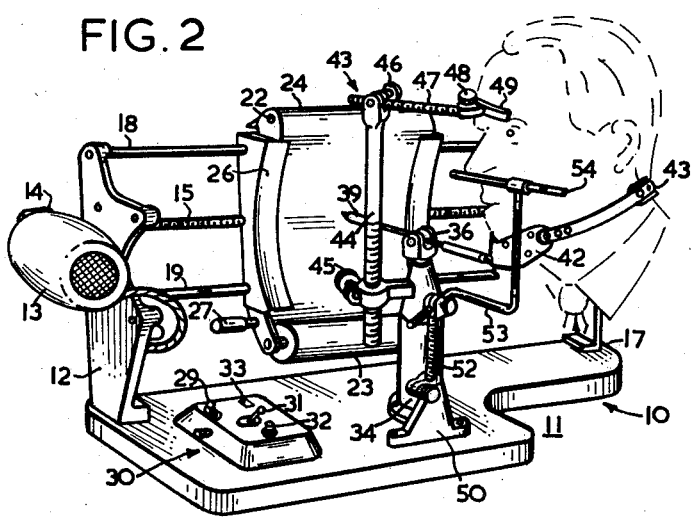

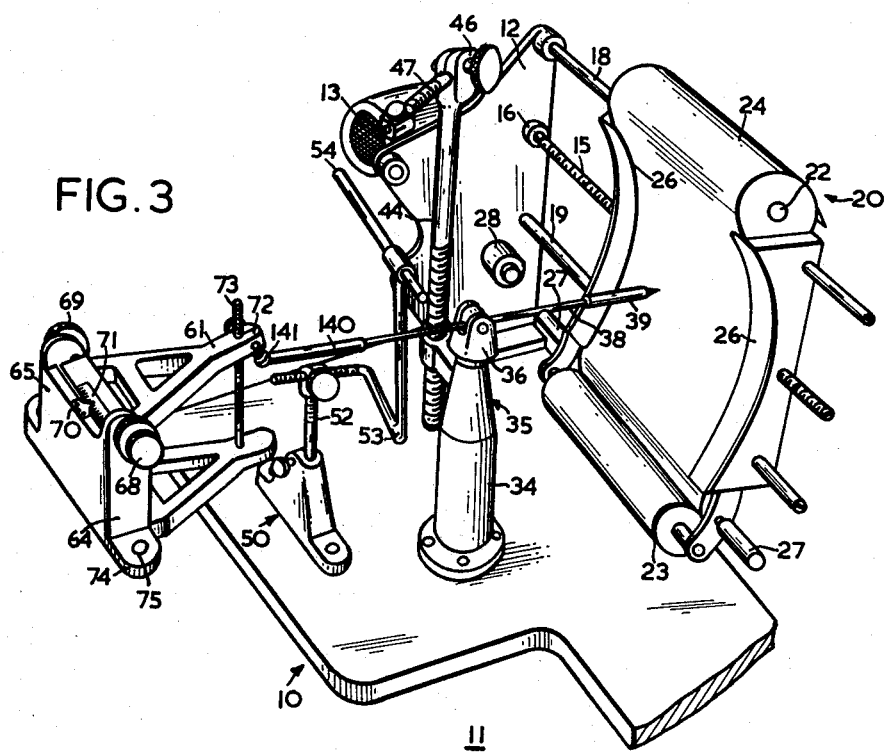

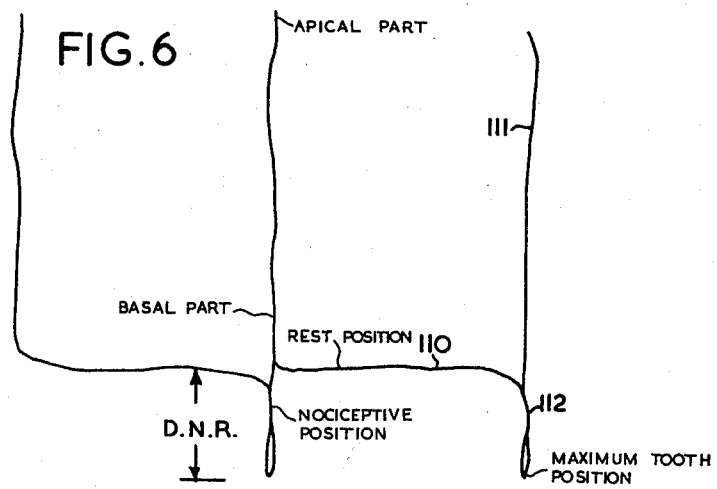
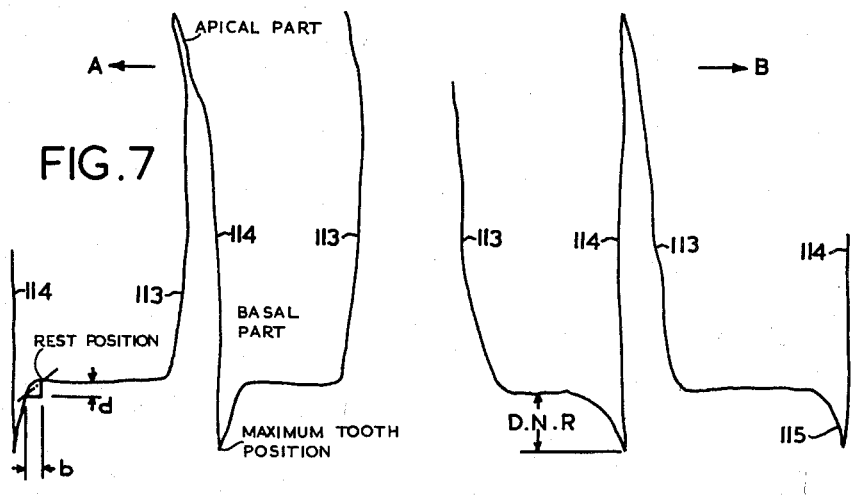
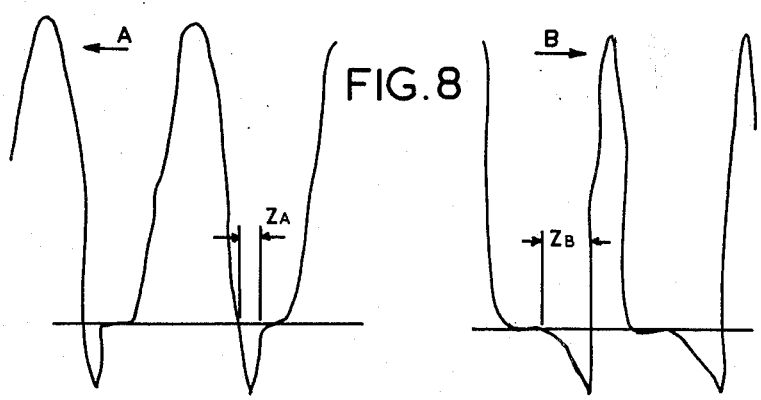

April 21, 1964  C. J. GRIFFIN  3,129,510
MEANS FOR RECORDING ORAL PROPRIOCEPTION
Filed July 16, 1962  4 Sheets-Sheet 4

United States Patent Office 3,129,510
Patented Apr. 21, 1964

3,129,510
MEANS FOR RECORDING ORAL PROPRIOCEPTION
Clifford John Griffin, Neutral Bay, New South Wales, Australia, assignor, by mesne assignments, to Fiscul Pty. Limited, Sydney, New South Wales, Australia, a company of New South Wales
Filed July 16, 1962, Ser. No. 210,051
16 Claims. (Cl. 32—19)

This invention relates to means for recording oral proprioception in humans, oral proprioception being the reflex ability and sensitivity of the mouth opening and closing muscles.

In order that a technical approach may be taken to the following disclosure the following denfiitions have been been included and may hereinafter be referred to by their multi-letter abbreviation where this is appropriate.

*Mandibular kinematogram.*—A graphic record of mandibular movements obtained from a patient exercising on the mandibular kinematograph (M.K.G.).

*Mandibular kinematograph.*—A machine and accessories designed for recording mandibular movements.

*Intermittent frontal mandibular kinematogram (I.F.M.K.G.).*—A record of intermittent mandibular movements from a frontal position.

*Continuous frontal mandibular kinematogram (C.F.M.K.G.).*—A record of rhythmic mandibular movements from a frontal position.

*Intermittent lateral mandibular kinematogram (I.L.M.K.G.).*—A record of intermittent mandibular movement from a lateral position.

*Continuous lateral mandibular kinematogram (C.L.M.K.G.).*—A record of rhythmic mandibular movements from a lateral position.

*Frontal position.*—The patient is placed in front of the mandibular kinematograph so that mandibular movements in a lateral and vertical direction are recorded The head is orientated in the Frankfort plane.

*Clench line.*—A line on the mandibular kinematogram depicting the position of the mandible relative to other positions when the teeth are clenched.

*Rest position.*—The position of the mandible when the masticatory muscles are at physiological rest (resting tenus).

*Dental nociceptive reflex (D.N.R.).*—A reflex occurring when the upper and lower teeth are briskly brought into contact. The mandible moves from the maximal tooth position to the rest position. It has two components, an initial fast component from the maximal tooth position to the nociceptive position and a terminal slow component from the nociceptive position to the rest position.

*Mandibular displacement.*—Displacement of the mandible relatively to the skull in either a lateral, posterior, or anterior direction. The degree of displacement is assessed by the direction of the D.N.R.

*Vertical Dimension.*—The distance between the base of the nose and the chin maintained by the dentition and alveolar bone.

*Lateral position.*—The patient is placed side on to the mandibular kinematograph so that mandibular movements in an antero-posterior and vertical direction are recorded.

*Maximum tooth position.*—The position of the mandible when the maxillary (upper jaw) and mandibular teeth are maximally intercuspidated.

*Nociceptive position.*—The position of the mandible reflexly assumed by stimulation of nerve receptors in the periodontal membrane, non-contact position).

*Frankfort plane.*—Straight line through margin of bony orbit directly under pupil eye to upper margin of external auditory meatus.

Heretofore endeavors to record oral proprioception have been made by using articulation or electromyographic devices which are of a complicated nature.

Research into the mandibular (lower jaw) position and into the performance of the muscles responsible for mandibular movement have been prompted by the large amount of human discomfort and complaints which have been traced to lack of harmony between the mandibular opening and closing muscles, jaw misalignment and other mouth deformities. The foregoing problems may be responsible for such complaints as locking of the jaws and limiting of the extent to which the mouth may be comfortably opened, migraine headaches due to the nerve center controlling the mandibular muscles not being in equilibrium when the jaws are in the maximum tooth position. The nerve controlling the mandibular muscles is centered high in the brain and continual impulses emitted therefrom due to the disharmony of the mandibular muscles causes the surrounding nerves to react and produce the migraine type headache. Pure nervous agitation without migraine may occur, which is also undesirable.

The present invention has for its object to provide means of a comparatively simple nature which utilises a simple reflex, the jaw opening reflex to draw graphs for an analysis of mandibular position. This reflex is usually observed in the decerebrate animal and has hitherto not been regularly ascertained in man.

The inventor has observed that when a patient is asked to open and shut his mouth briskly with his eyes shut a reflex appears which lies on the graphical path traced by the mandible (lower jaw) between the teeth clenched position and the non-contact or nociceptive position. If this path is median or straight then the tooth position is good and the jaw muscles are working in harmony. If this is not the case there are deviations of the graphed path; this deviation or lateral displacement of the mandible and other deflections on the graph can be diagnosed and by using known methods corrected.

The invention comprises apparatus for use in recording oral proprioception comprising means to position the skull of a patient, means adapted to be secured to the chin of the patient and a connection from the last mentioned means to a marking means adapted to indicate sideways and/or longitudinal movements of the jaws of the patient relatively to one another during the opening and closing thereof.

The invention further comprises apparatus for recording oral proprioception comprising a base plate, supports for a carriage mounted thereon, a carriage mounted for horizontal movement upon such supports, means to move the said carriage horizontally, a surface on the said carriage or on a part carried thereby, which is concavely curved about a horizontal axis, means to mount paper or other sheet material on which a graph may be traced upon the said curved surface, a support for a marking member adapted to make marks upon the said paper or other material supported at or near the center of curvature of the curved surface for pivotal movements about both vertical and horizontal axes and extending beyond said pivot, a further member telescopically interengaging with the extended portion of the said marking member support, a chin clamp pivotally mounted upon the said further member for pivoting about a horizontal axis and adapted to be secured to the chin of a patient, and adjustable means carried by said base plate adapted to secure the skull of said patient in position relatively thereto.

There is desirably a ball joint or other universal joint between the chin clamp and the further member specified.

Preferably the means for securing the head of the patient are adapted to secure the skull aforesaid facing in either of two directions at right angles to one another.

The invention may include also means for mounting a pair of dentures or castings of the patient's jaws in a position analogous to that of the jaws of the patient, with a connection between one of the said jaws and the further member previously specified.

A preferred embodiment of the present invention will now be described by way of example with reference to the accompanying drawings in which:

FIGURE 1 is a perspective view of the said embodiment in readiness to take a test of a human mouth;

FIGURE 2 is a perspective view of the invention in readiness to take a second type of test on a human mouth;

FIGURE 3 is a perspective view of the invention in readiness to take a test using an artificial patient;

FIGURE 4 is a partial sectional plan view of an articulator or artificial patient;

FIGURE 5 is an elevation of the articulator of FIGURE 4 showing a pair of dentures mounted therein and FIGURES 6 to 12 are typical graphs (on a magnified scale) resulting from tests made upon a human patient by use of the apparatus of this invention.

The machine of the invention comprises a substantially rectangular base plate 10, one long side of which will be referred to as the front of the baseplate; the front right hand corner of the baseplate is removed to form a rectangular cut-out 11. Mounted upon the upper face and across the baseplate 10 towards the left hand end thereof (this being the wider portion of the baseplate) is an upstanding robustly constructed bracket 12 provided with mounting means for an electric motor 13. The motor 13 is mounted outside the baseplate 10 with its working spindle substantially horizontal and projecting towards the back of the base 10 its free end engaging in a right-angled drive reduction gear box 14 mounted upon the outer face of the bracket 12. The gear box 14 transfers the drive of the motor 13 to a shaft 15 which is threaded along most of its length and is rotatably supported at each of its ends in a bearing. One of the shaft supporting bearings 16 is in the bracket 12, the other is in an upstanding bracket 17 located at the right hand or narrower end of the base plate 10; it is of lighter construction that the bracket 12 and the shaft 15 supported therebetween lies parallel to the back edge of the baseplate 10 and slightly inwards therefrom.

Above and below the shaft 15 are smooth shafts 18 and 19 respectively; they are both parallel to the shaft 15 and are non-rotatable; the shafts 18, 15 and 19 lie vertically one below the other in that order. Mounted slidably upon the shafts 18 and 19 is a carriage 20 which is provided with a threaded portion into which the shaft 15 freely screws. This enables the carriage 20 to be drawn or pushed along the shafts 18 and 19 in response to the rotation of the shaft 15. The carriage 20 comprises a frame having mounted across it at its upper extremity a rotatable roller 22 and at its lower extremity is a spool 23 for holding "graph type" paper 24 which lies parallel to the roller 22. The paper 24 passes from the spool 23 to the roller 22 around which it may be wound, while travelling via a curved path defined by a concave face 25 on the member 20, the axis of curvature thereof being a horizontal line approximately at the level of the axis of the threaded shaft 15. The member 20 has guides 26 extending along and inwardly from its outer edges which are a small distance from the curved face of the member 20, allowing clearance for the paper 24 to pass therebetween, and so follow closely the curvature of the member 20.

Projecting horizontally from each side of the frame of the carriage 20 is a spring loaded member 27, each of which members is in axial alignment with a depressible plunger of a co-acting plunger type electric switch 28, one of the switches 28 being located on the inner face of each of the members 12 and 17. As the carriage 20 moves along upon the guide rails 18 and 19 in response to the push or pull of the threaded member 15, and near the limit of the carriage movement towards either member 12 or 17, contact occurs between the members 28 and 27 operating an over-riding circuit through the switch 28 and by-passing a motor energising control switch 29 normally used for traversing the carriage 20. An electric control panel 30 is mounted upon the wider portion of the base plate 10 which incorporates the switch 29, a motor directional control switch 31 (for reversing the direction of motor spindle rotation) an inching control button 32 for intermittent traversing of the carriage 20 and an indicator light 33.

Mounted upon the non-cutaway portion of the baseplate 10 and approximately midway along the travel of the carriage 20 is an upstanding column 34; its upper extremity (which approximates in elevation the threaded shaft 15) is in the form of a yoke 35, the opening of which is transverse to the length of the baseplate 10. The yoke 35 has mounted between its legs 36 a stylus; the bearings for supporting the stylus are of a precision type, and include a ball and socket, allowing large angular displacement of the stylus in any direction while maintaining maximum control over slackness in the support of said stylus. The stylus comprises a straight slender member 38 which is mounted towards one of its ends upon the aforespecified bearings; the longer portion projects towards the curved surface of the carriage 20 and on this free end is mounted a spring-loaded marking pen 39 adapted to be manually locked in a retracted position when not required and manually released from that position so as to urge against and mark the paper 24 upon the curved surface 25 under the pressure exerted thereon by its spring loading.

The straight slender member 38 extends from its supporting bearings toward the front of the baseplate 10 and is at this end circular and, highly polished or chromed and graduated in divisions of equal magnitude. Engaging the graduated end of the member 38 is a tubular member 40 which has its bore highly polished or chromed, and which telescopically encases the graduated end of the member 38 with little sliding clearance. That end of the member 40 not engaging the member 38 is fitted with a ball and socket joint 41 which swivellingly engages a chin support member 42 (furnished with chin-engaging rubber cups—not shown), which in turn co-acts with a neck band 43 of adjustable length to permit the swivel connected members 40 and 42 to accurately follow and record the chin movements of a patient due to their firm attachment thereto (the patient is represented in dotted lines in FIGURES 1 and 2).

The movement of a patient's chin during induced mouth opening and closing cycles reflects the performance of the muscles responsible for these movements; this performance is recordable by means of the stylus pen 39 upon the paper 24, together with the graphical record resulting from the jaws of the patient being snapped shut causing jarring of the teeth and their deflection into their sockets. To ensure accurate graphing the head of the patient during the recording sessions must be firmly braced, and to this end a forehead support and a nose support are supplied.

The forehead support 43 comprises a circular vertically mounted member 44 graduated along its lower portion; a mounting for the member 44 is in the form of a clamping arm 45 extending out from the column 34 horizontally toward the motor 13, the free end thereof constituting a clamp into which the member 44 is slidingly engaged and then clamped. The upper end of the member 44 is itself a clamp 46 which slidingly houses and can clamp a rod-like member 47, which is graduated along its length and normally lies in a horizontal plane and which has in its turn a clamp 48 at one of its ends which adjustably holds a curved forehead support 49.

A further support 50 is provided which is located beneath the patient's nose and supports the weight of the patient's head. The support 50 comprises an upstanding member mounted upon the baseplate 10 having a vertical hole extending downwardly thereinto to house a graduated rod-like member 52, which is clamped in the upstanding member of the support 50 by tightening a thumbscrew 51 and compressing a slit extending from an outer face of the upstanding member to the vertical hole therethrough. The upper end of the member 52 forming a clamp, houses a support member 53 adapted to extend upwardly and because of its shape present a horizontal nose-supporting bar 54.

A standard test procedure will now be described by way of example.

A patient is seated in a natural position before the machine of the present invention facing the carriage 20, with his chin, in the mouth-closed condition, approximating the elevation of the threaded shaft 15. The members 42 and 43 are fitted to the patient and the member 40 slid over the end of the member 38; the pen 39 released and allowed to rest upon the paper 24 on the curved surface 25 of the carriage 20, and its drawing point is adjusted to lie in elevation on a horizontal line of the graph paper 24 coincident with the deepest portion of the curved surface 25. The forehead and nose supports are now adjusted to keep the patient in the selected position. The patient is instructed to close his eyes.

The carriage 20 is traversed continuously in both directions (by means of the switch gear hereinbefore described). There should be one line recorded (each traverse being coincident with the other). A set thickness gauge block, say 10 mm., is now clamped by the patient between his front teeth and a second traverse of the carriage to and fro should produce a second single line upon the graph paper 24 thus establishing by means of the distance between the two recorded lines a ratio between the actual teeth deflection and the recorded teeth deflection, this ratio is calculated and noted.

A series of tests are now run in which the patient is first told to open and close his mouth rhythmically with short pauses between each complete cycle, while the carriage is first traversed continuously one way, and later upon fresh paper a recording is taken with the carriage moving continuously in the opposite direction.

Graphs are again taken with the patient opening and closing his mouth, each cycle commencing upon command and each being taken while the carriage 20 is stationary; the carriage is inched along between each record by means of the electrical switch gear as hereinbefore described. Notes are taken of the position of the graduated members so that the test conditions may be re-created if desired.

The patient is now turned through 90° (as shown in FIG. 2) and sits with his right arm in the baseplate cutout 11 and faces toward the motor 13, the member 42 now being at 90°, to the member 40 but still coupled thereto through the swivel joint 41. The patient is located as before and the forehead and nose supports adjusted.

The ratio test, the opening and closing test on continuous traverse in both directions of the carriage 20, and the opening and closing test on intermittent traverse are now repeated and recorded; again a note is made of the graduated member positions for future reference.

During all the foregoing tests it is essential that at the completion of each mouth-closing cycle, the teeth of both jaws be brought sharply into maximum occlusal condition.

Some typical graphs as recorded during an examination as above described are as illustrated in FIGURES 6 to 12.

FIGURE 6 represents the record of a patient's muscle reaction in the frontal position. The patient, with the carriage 20 stationary, opens and shuts the jaws once, the carriage 20 is moved and the exercise is repeated. This record is called an intermittent frontal mandibular kinematogram (I.F.M.K.G.). This graph has been obtained from a patient who has nearly perfect muscular co-ordination. The line 110 represents the mouth closed (teeth clenched) or datum line. The line 111 represents the opening and closing movements, and the line 112 represents the dental nociceptive reflex (D.N.R.). This reflex is a re-opening of the jaws occurring after the tooth position has been achieved and represents reflex repositioning to a position of physiological rest. The integrity of this reflex indicates the condition of oral proprioceptive mechanisms. Ideally the lines 111 and 112 depict superimposed opening and closing movements on the I.F.M.K.G.

FIGURE 7 represents the record of a patient's muscle reaction in the frontal position. The patient opens and shuts the jaws rhythmically and the carriage 20 is run continuously in the direction A or B. The graph is called the continuous frontal mandibular kinematogram (C.F.M.K.G.). The line 113 depicts an opening movement by the patient and the line 114 a closing movement whilst the line 115 depicts the dental nociceptive reflex. Two components of the line 115, a vertical component ($a$) and a horizontal component ($b$) depict respectively a fast inhibition of the mandibular elevators and a re-opening of the mandible from a maximum tooth position to the nociceptive or physiological rest position. The component ($b$) depicts the opening of the mandible from a non-contact position to a physiological rest position. Under ideal conditions the graphs taken with the carriage 20 moving in the direction A will be the mirror image of the graphs taken with the carriage 20 moving in the direction B.

FIGURE 8 represents the record of a patient's muscle reaction in the frontal position who has a right lateral displacement of the mandible. (References herein to lengths such as 2 mm. refer to the original drawings lodged herewith.) The patient opens and shuts the jaws rhythmically and the carriage 20 is run continuously in the direction of the arrows A and B (C.F.M.K.G.). The degree of mandible displacement is assessed by the divergence of the D.N.R. from the vertical. In the direction A the displacement is closed up due to the carriage movement, in the direction B it is opened up by the carriage movement. If $x$ equals the mandibular displacement, $y$ equals the panel movement (which will be a negative quantity for panel movements in the direction A and a positive quantity for panel movements in the direction B) and $z$ equals the graphed mandibular displacement, which is the algebraic summation of $x$ and $y$, then carriage movement in the direction A decreases $x$, so that if $x-y=2$ mm.$=z_A$, and carriage movement in the direction B increases $x$, so that if $x+y=6$ mm.$=z_B$. Adding $z_A$ and $z_B$ $2x=8$ mm. therefore $x=4$ mm. Since the graph in this instance has magnified the movements of the jaw by 6 (derived from a ratio of 6 to 1 between the actual patient mandible movement and its graphical representation due to built in magnification in the machine and the fact that for clarity actual graphical results have been magnified here by 2) actual displacement is 4/6$=$.6666 mm.

FIGURE 9 represents the record of a patient's muscle reaction in a lateral position. The patient with the carriage stationary opens and shuts the mouth; the recording is moved and the exercise repeated. This record is called an intermittent lateral mandibular kinematogram (I.L.M.K.G.). The line 116 depicts an opening movement, the line 117 a closing movement and the line 118 a reflex opening movement (D.N.R.) by the patient. In this graph the nociceptive position, the rest position and the clench position are virtually in the same horizontal plane which is their usual relationship.

FIGURE 10 is a record of a patient's muscular reaction in a lateral position, the patient being requested to open and close the jaws rhythmically while the carriage moves continuously. This graph is called a continuous lateral mandibular kinematogram (C.L.M.K.G.). This graph depicts near perfect muscular co-ordination.

FIGURES 11a and 11b represent the recordal of a patient's muscle reaction by a C.L.M.K.G. and a I.L.M.K.G. This patient's rest position, nociceptive position and clench position do not coincide, this indicates a loss of vertical dimension, that is, a reduction in the normal distance between the chin and the base of the nose, with the mouth closed.

FIGURES 12a and 12b are respectively records of a patient's muscular reaction after and before treatment in a lateral position. It is a C.L.M.K.G. The maximum tooth position could not be achieved because of an "open bite." Grinding certain teeth produced a normal graph.

As can be appreciated, diagnosis of faults detected from the graph FIGURES 6 to 12 cannot all be acted upon at once, as correction of one defect, for example over-bite, may drastically alter the jaw muscular performance, and to the end an articulator or artificial patient 60 forms an important part of the invention and is illustrated in FIGURES 3, 4 and 5.

The articulator 60 comprises an upper member 61 and a lower member 62, which are pivotally interconnected and lie one above the other. The lower member 62 comprises an isosceles triangular shaped frame having at each end of its smallest side an upstanding pillar 63 or 64, which are joined together by a bar 65. Between the pillars 63 and 64 a bar 66 is supported which is an extension of the smallest side of the member 61, which is an isosceles triangular shaped frame in size similar to the member 62. Each end of the member 66 is provided with a conical recess 67 into each of which a conical pointed screw 68 fits whilst the threaded body of each is screwed into and through one of the pillars 63 or 64. The member 66 is shorter than the gap between the pillars 63 and 64, so that by adjusting the screws 68 the member may be laterally displaced relative to the member 62, accurate record of any lateral displacement is permitted by reading a graduated scale 71 mounted upon the upper face of the member 67 relative to an overhanging pointer 70 mounted upon the member 65 and lining up with the graduations on the member 71. At the apex of the member 61 a clamp 72 is provided which slidably embraces and may clamp upon a graduated downwardly extending rod-like member 73, which projects through the clamp 72 and engages the upper face of the member 62 adjacent the apex thereof by means of which the pivotal movement of castings taken from a patient's mouth may be regulated The pillars 63 and 64 are provided at their lower ends with lugs 74 having holes 75 therethrough to allow the articulator to be bolted down while in use.

The function of the articulator is to simulate the jaws of the patient and to permit further graphs to be taken without the patient. In operation the member 61 has mounted beneath it an actual plaster casting of the patient's upper mouth and teeth, and the member 62 has mounted upon its upper face an actual plaster casting of the patient's lower mouth and teeth, these mouldings 76 are mounted in the correct relationship one to the other by means of the rod 73 holding the members 61 and 62 apart and are adjusted for lateral alignment by means of the screws 68.

As each defect suggested by the patient's graph is removed (by grinding down or building up the plaster teeth) further graphs are taken by mounting the articulator 60 as shown in FIGURE 3 and by slidingly engaging a member 140 which is provided with a ball joint connection 141 to the clamp 72 upon the shorter, graduated end of the member 38. A process of elimination is pursued till the best possible results are obtained, notes having been made of each corrective step taken; the patient may then be recalled to have his jaw faults similarly treated.

I claim:

1. Apparatus for recording oral proprioception comprising a base plate, supports for a carriage mounted thereon, a carriage mounted for horizontal movement upon such supports, means on one of said supports to impart the said horizontal movement to said carriage, a surface moveable with the said carriage which is concavely curved about a horizontal axis, means on said carriage to mount a record sheet upon the said curved surface, a support, a marking member mounted upon the said support and adapted to make marks upon the said record sheet, said support being supported at or near the center of curvature of the curved surface for pivotal movement about both vertical and horizontal axes and extending beyond said pivot, a further member telescopically interengaging with an extended portion of the said marking member support, a chin clamp pivotally mounted upon the said further member for pivoting about a horizontal axis and adapted to be secured to the chin of a patient, and adjustable means mounted upon the said base plate adapted to locate the skull of said patient in position.

2. Apparatus as claimed in claim 1 in which the pivotal connection between the further member specified and the chin clamp specified is a universal joint.

3. Apparatus as claimed in claim 2 in which the means for locating the head of the patient are adapted to locate the head aforesaid facing in either of two directions at right angles to one another.

4. Apparatus as claimed in claim 3 in which there is a cut-out portion in the base plate to facilitate the movement of the patient from one position to another.

5. Apparatus as claimed in claim 1 including also an electric motor coupled to and adapted to traverse the carriage specified in its horizontal movements and manual controls in circuit with and adapted to energise said electric motor when traversing is required.

6. Apparatus as claimed in claim 4 in which the controls aforespecified are adapted to effect at will either continuous horizontal movement of the carriage or single inching movements thereof.

7. Apparatus as claimed in claim 5 in which switch means in circuit with the motor specified are provided adapted to be engaged by the carriage upon completion of its traverse and thereupon to stop the said motor.

8. Apparatus as claimed in claim 4 in which the electric motor is arranged to rotate through a speed reducing gear a horizontal feed screw threaded through the carriage aforesaid.

9. Apparatus as claimed in claim 1 in which the adjustable locating means for the head of the patient include a nose support.

10. Apparatus as claimed in claim 1 including also indicating means arranged to indicate the settings of the head securing means employed for any particular patient.

11. Apparatus as claimed in claim 1 in which the record sheet is a roll of flexible sheet material whereon a graph may be traced carried by the carriage and in which there are means carried by the carriage to feed the said sheet material at will in a vertical direction.

12. Apparatus as claimed in claim 1 including also means for mounting the jaw castings comprise upper and jaws in a position analogous to that of the jaws of the patient, with a connection between one of the said dentures or jaws and the further member previously specified.

13. Apparatus as claimed in claim 12 in which means are provided for indicating the relative setting of the two jaw castings.

14. Apparatus as claimed in claim 12 in which the means for mounting a pair of castings of the patient's lower triangular shaped members pivoted to one another, together with means to adjust their pivotal separation and also means to adjust the horizontal displacement of one relatively to the other.

15. Apparatus as claimed in claim 1 in which the marking member specified is spring-loaded towards the concave surface specified.

16. Apparatus for use in recording oral proprioception comprising means to position the skull of a patient, and means connected to said first means adapted to be connected to the chin of the patient when so positioned including a marking means adapted to indicate sideways and/or longitudinal movements of the jaws of the patient relatively to one another during the opening and closing of said jaws.

References Cited in the file of this patent
UNITED STATES PATENTS

| | | |
|---|---|---|
| 1,080,809 | Burch | Dec. 9, 1913 |
| 2,814,876 | Stuart | Dec. 3, 1957 |